Figure 2:
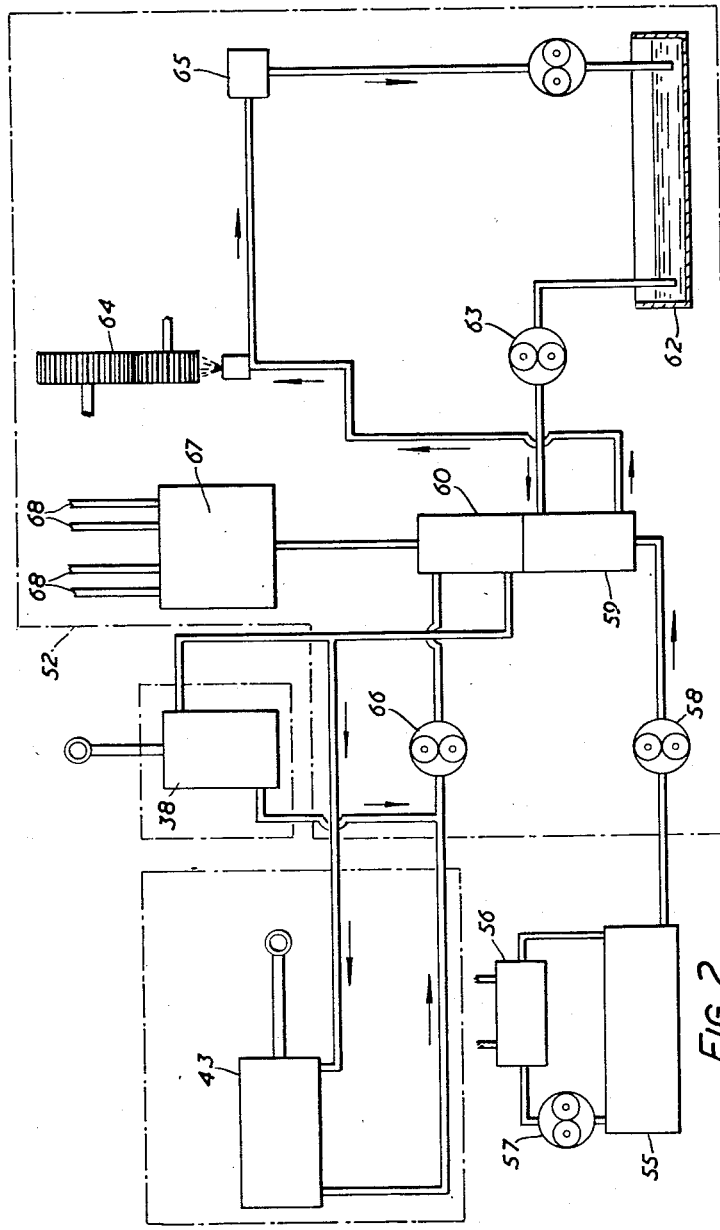

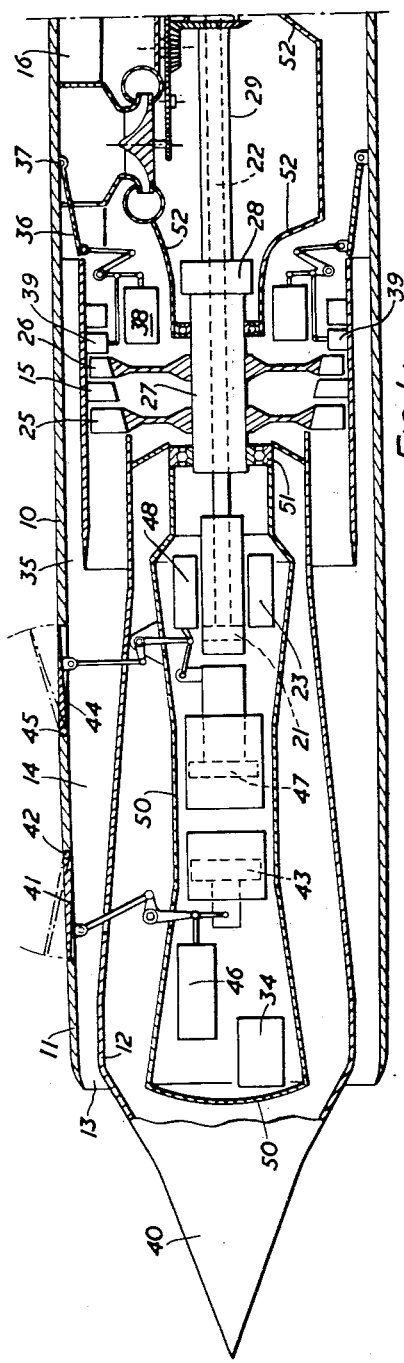
FIG. IA.
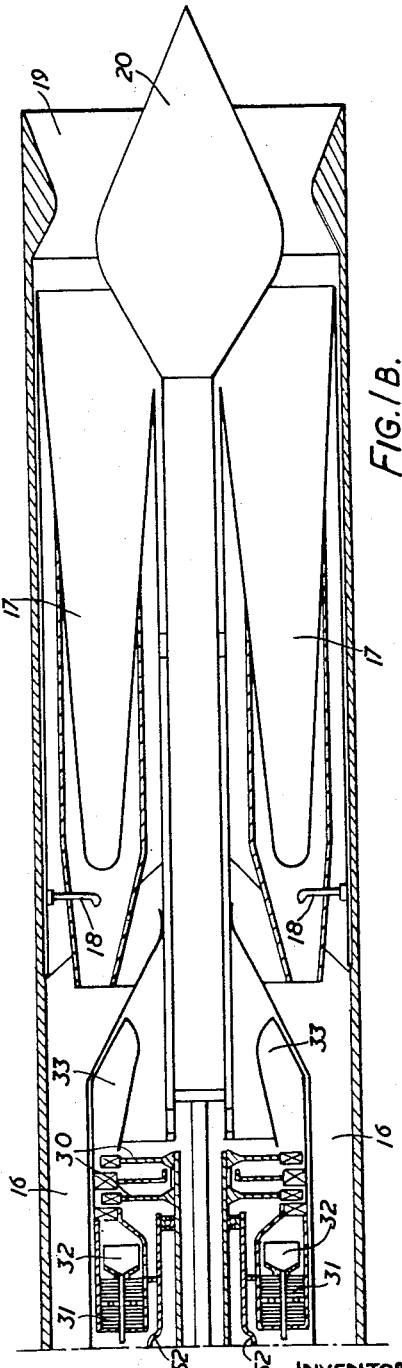
FIG. IB.
INVENTORS
J. V. BLYTH
G. C G. MANSFIELD
BY
Watson, Cole, Grindle & Watson
ATTORNEY 3,000,180
ENGINES FOR HIGH SPEED AIRCRAFT OR MISSILES
Geoffrey Charley Gerald Mansfield, London, and Jack Vallis Blyth, Ewell, England, assignors to D. Napier & Son Limited, London, England, a company of Great Britain
Filed Apr. 3, 1958, Ser. No. 726,290
Claims priority, application Great Britain Apr. 4, 1957
4 Claims. (Cl. 60—39.08)

This invention relates to propulsion engines for high speed aircraft or missiles, of the kind employing a liquid fuel, and having component or auxiliary mechanism such as lubrication or hydraulic servo systems, which necessarily contain a liquid medium such as oil.

At high flight velocities, above Mach 2 for instance, the heat generated on exposed surfaces of the engine by air friction and ram effects may rise to such an extent that the operation of moving parts, and in particular of liquid operated mechanisms, will be adversely affected. It will be appreciated that oil for example at high temperatures will tend to carbonise. It has been proposed to employ as a coolant the liquid fuel that is supplied to the engine but the heat capacity of the fuel is limited, and in any case a substantial proportion of its heat capacity may be needed to cool other parts of the aircraft or missile not directly associated with the engine. Thus the fuel may be heated substantially above tank temperature even before it is delivered to the engine.

In such conditions it may be impossible to obtain sufficient cooling effect from the fuel to maintain the liquid of all the various component or auxiliary mechanisms below the maximum safe operating temperature. According to the present invention however the fluid circuits of the mechanisms are arranged in at least two separate closed circuits, each incorporating a separate heat exchanger, the liquid fuel being passed in series through these heat exchangers, to maintain the liquid in one of the circuits at the minimum temperature attainable by the cooling effect of the fuel at its delivery temperature to the engine. Thus although the temperature of the liquid in the latter or downstream heat exchanger is higher than would otherwise be the case, the temperature of the liquid in the first heat exchanger will be appreciably lower. Thus the invention takes advantage of the fact that it may be possible for the liquid medium of one mechanism to rise to a somewhat higher temperature, without seriously impairing the operation of the mechanism.

By employing separate closed circuits it may be possible to adopt different liquid media, one of which will in itself be capable of withstanding higher temperatures. Even if the same liquid is employed in the separate fluid circuits however the invention will still provide advantages, in that the ability of the fluid to withstand high temperatures depends partly upon the function of the liquid in the respective mechanism. Thus the ability of oil for example to provide good lubrication may be impaired at a lower temperature than its ability to operate as a simple hydraulic servo medium.

According to a preferred feature of the invention, therefore, one closed fluid circuit comprises an oil lubrication system, and another closed circuit comprises a hydraulic servo system, the heat exchanger of the lubrication system being arranged upstream of the heat exchanger in the servo system, in relation to the direction of flow of the liquid fuel through the heat exchangers.

In utilising the cooling effect of the liquid fuel to the maximum there is a risk that the fuel itself may be heated above a safe operating temperature, for example it may be heated to a temperature close to its boiling point. According to another preferred feature of the invention therefore the engine includes means for increasing the pressure of the fuel after it has passed through a first heat exchanger, and before it is passed through a second heat exchanger.

The first heat exchanger may be associated with apparatus not directly associated with the engine, the heat exchangers of the closed fluid circuits all being arranged on the downstream side of the fuel pressurizing means.

It will be appreciated that the increased fuel pressure raises the boiling point of the fuel, and thus permits the fuel to be used for further heat exchange purposes. Although the temperature at which the fuel absorbs this extra heat is higher when the fuel is in the pressurized state, it is generally permissible for the engine parts which require cooling to operate at higher temperatures than other parts of the aircraft or missile which require cooling, such as a pilot's cockpit. Moreover, the pressure of the fuel will in general require to be raised before it can be used in the engine, for example by injection through burner nozzles.

Preferably the component or auxiliary mechanisms of the engine which are to be cooled by the heat exchangers referred to are housed in thermally insulated compartments and means are provided for passing the coolant liquid through these compartments. The heat exchangers and other parts of the fuel supply circuit may also be mounted within a similar thermally insulated compartment.

The invention may be performed in various ways but one specific embodiment will now be described by way of example as applied to an aircraft propulsion engine which is illustrated in sectional elevation in FIGURES 1A and 1B of the accompanying drawings. FIGURE 2 is a diagrammatic illustration of the fuel, lubrication and hydraulic servo systems.

This engine is a compounded ram jet-turbo rocket engine. It includes an outer generally cylindrical casing 10, the front end 11 of which forms with a conical centre body 12 an annular air intake 13 leading to an axial diffuser passage 14 and then to an axial flow compressor 15 from which the air passes rearwardly through an annular air duct 16 into an annular combustion chamber 17 to which a hydrocarbon fuel such as kerosene is supplied through burners 18. The hot products of combustion issue through a nozzle 19 at the rear of the engine as a high speed propulsion jet. A bullet 20 is provided for adjusting the area of the nozzle, this bullet being axially movable by a hydraulic ram 21 disposed in the front part of the engine and connected to the bullet by a long shaft 22 extending rearwardly through the centre of the engine. The ram 21 is controlled by a follow-up servo valve 23.

The compressor comprises two rotor blade rings 25, 26 mounted on a hollow shaft 27 which is connected by a freewheel mechanism 28 to another hollow shaft 29 at the downstream end of which is mounted a two stage axial flow turbine 30. This turbine is driven by a rocket system including catalytic decomposition chambers 31 to which hydrogen peroxide is supplied and decomposed to form oxygen-rich steam, and rocket combustion chambers 32 into which some paraffin is then introduced for combustion with some of the oxygen. The combustion products, which are still rich in oxygen, are expanded in the turbine 30, and then pass through ducts 33 to enter the main combustion chamber 17 along with the air from the said annular duct 16, to contribute to the propulsive effect of the jet. Also, the residual oxygen content of the turbine effluent assists the main combustion process.

Provision is also made for the engine to operate as a pure ram jet when a sufficiently high speed has been reached. For this purpose an annular by-pass duct 35 is provided around the axial flow compressor 15, and the downstream end of this by-pass duct communicates through flap valves 36, pivoted at 37, with the said annular air duct 16 at the downstream end of the compressor. These flap valves 36 are actuated by hydraulic servo motors 38 which also actuate a ring of adjustable stator blades 39 for the last stage of the compressor, to increase the flow through the compressor and losses therein during ram jet operation. At a predetermined Mach number, when the ram effect alone will provide sufficient compression of the air, and which is sensed by a Mach meter indicated generally at 34, the hydrogen peroxide and paraffin supply to the rocket system is automatically shut off, thus stopping the turbine 30 and removing the power supply for the axial flow compressor 15. At the same time the by-pass flap valves 36 are opened to allow air from the air intake 13 to pass through the annular by-pass duct 35 to the combustion chamber 17. The free wheel mechanism 28 between the turbine 30 and the axial flow compressor 15 permits the latter to "windmill" during ram jet operation.

The centre body 12 has a conical nose tip 40, and co-operates with the outer cowl 11 to provide shock compression during ram jet operation. Behind the lip of the cowl at the beginning of the diffuser section 14 there is an annular port providing communication between the outside of the engine and the diffuser section. During ram jet operation this port is closed by a series of petal type flaps 41 pivotally attached to the outer shell of the engine at their rear ends 42. During turbo rocket operation these flaps are swung outwards as shown in chain lines by a hydraulic servo motor 43 controlled by a follow-up servo valve 46, so as to provide an additional annular air intake of larger diameter surrounding the main air intake 13.

Towards the rear end of the diffuser section 14 and upstream of the axial flow compressor 15 there is arranged another series of similar pivoted flaps 44 controlling another annular port in the outer shell 11 which constitutes a controllable spill port which is opened during ram jet operation to the extent required to maintain the desired shock pattern at the intake. These flaps 44 are pivotally connected to the shell at their upstream ends 45 and are opened outwards by a hydraulic servo motor 47 controlled by a follow-up servo valve 48.

Thermally insulated compartments are provided in the engine within the annular air duct through the engine. There is a front compartment 50 lying mainly within the diffuser section 14 and terminating adjacent the forward end of the compressor 15. This compartment houses the hydraulic servomotors 43, 47 which are connected through mechanical linkages with the said two series of flaps 41 and 44, and their control valves 46, 48. It also houses the Mach meter 34 and the shock sensing system, a forward bearing 51 for the axial flow compressor 15, and the hydraulic ram 21 for adjusting the position of the nozzle bullet 20.

A second insulated compartment 52 surrounds the shaft 29 connecting the turbine to the compressor and encloses the freewheel mechanism 28, pumps for lubricant, servomotor fluid, paraffin and hydrogen peroxide, gearing for driving these pumps and other auxiliaries. This compartment also contains a sump of lubricating oil, two heat exchangers through which paraffin fuel is pumped in succession as a coolant and a metering unit for the paraffin.

The fuel supply system and lubricating and hydraulic servo supply circuits are illustrated in FIGURE 2.

Paraffin is supplied from a tank 55 mounted outside the engine, for example in an aircraft or missile to which the engine is attached. The fuel in this tank is used as a coolant or heat sink for parts of the aircraft and a heat exchanger 56 and fuel circulating pump 57 are provided for the purpose. The fuel in the tank 55 may thus be at a relatively high temperature possibly close to the vaporisation point. In order to permit the fuel to be further heated, and used as a coolant in the process, it is admitted to the engine through a pressurising pump 58 which raises its pressure substantially. The fuel then passes in succession through two heat exchangers 59, 60.

In the first heat exchanger 59 the paraffin takes up heat from lubricating oil which is delivered by a pump 63 from a sump 62, through the heat exchanger, to the gearing for the pumps and auxiliaries indicated diagrammatically at 64 and to the turbine and compressor bearings indicated at 65 all these parts being within the said insulated compartments 52 and therefore receiving little heat. In the second heat exchanger 60 the paraffin takes up heat from the actuating fluid of the several hydraulic servomotors such as 43, 47, 21 and 38. The paraffin then passes to a metering unit 67 and on to the burners 18 via ducts 68.

The hydraulic servo circuit includes a pressurising pump 66 which impells the servo fluid through the heat exchanger 60, and thence in parallel to the servo rams two of which are indicated diagrammatically at 38 and 43.

The heat exchanger 59 being upstream of heat exchanger 60 in the fuel supply line, will have a lower temperature datum, and this is desirable since the lubricating oil may tend to carbonise if heated excessively with risk of damage to bearings and other high speed parts. The hydraulic servo liquid on the other hand can safely be allowed to reach higher temperatures, since the servo mechanisms are relatively slow moving. In the present example the paraffin will enter the engine at pump 58 at a temperature not exceeding 150° C. and in passing through the two heat exchangers its temperature may be raised 30° C. It then passes to a fuel metering unit 67, and thence to delivery liners 68 leading to burners 18 in the main combustion chamber 17. The lubricating oil entering the first heat exchanger 59 may be at a temperature of about 250° C. while the servo liquid entering the second heat exchanger may be at a temperature of about 300° C.

What we claim as our invention and desire to secure by Letters Patent is:

1. A propulsion engine for high speed aircraft or missiles including means for supplying a liquid fuel to the engine, a closed fluid circuit comprising an oil lubrication system, another separate closed fluid circuit comprising a hydraulic servo system, and a separate heat exchanger included in each of said fluid circuits, the liquid fuel being passed in series, first through the heat exchanger in the oil lubrication system, and then through the heat exchanger in the hydraulic servo system to function as the cooling medium for both heat exchangers.

2. A propulsion engine as claimed in claim 1 including means for increasing the pressure of fuel before it passes through the heat exchangers.

3. A propulsion engine as claimed in claim 1 in which the component or auxiliary mechanisms are mounted in one or more thermally insulated compartments.

4. A propulsion engine as claimed in claim 1 in which the heat exchangers are mounted in at least one thermally insulated compartment.

References Cited in the file of this patent

UNITED STATES PATENTS

| 2,675,671 | Malgieri | Apr. 20, 1954 |
| 2,784,552 | Vickland | Mar. 12, 1957 |
| 2,809,810 | Carroll | Oct. 15, 1957 |

FOREIGN PATENTS

| 627,386 | Great Britain | Aug. 8, 1949 |
| 749,684 | Great Britain | May 20, 1956 |
| 763,449 | Great Britain | Dec. 12, 1956 |

OTHER REFERENCES

Publication: Lubrication, vol. 40, No. 4, April 1954, page 46.